(12) United States Patent
Gautama et al.

(10) Patent No.: US 9,086,879 B2
(45) Date of Patent: Jul. 21, 2015

(54) METHODS AND APPARATUS FOR OPTIMIZING BATTERY LIFE IN A REMOTE DEVICE

(71) Applicant: GM GLOBAL TECHNOLOGY OPERATIONS LLC, Detroit, MI (US)

(72) Inventors: Neeraj R. Gautama, Whitby (CA); Daniel G. Foisy, Pickering (CA); Ismail Hamieh, Windsor (CA); Jonathan L. Oakes, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 13/952,419

(22) Filed: Jul. 26, 2013

(65) Prior Publication Data
US 2015/0028995 A1 Jan. 29, 2015

(51) Int. Cl.
*G06F 17/00* (2006.01)
*G06F 1/32* (2006.01)
*B60R 25/24* (2013.01)
*G07C 9/00* (2006.01)

(52) U.S. Cl.
CPC ............ *G06F 1/3215* (2013.01); *B60R 25/241* (2013.01); *G07C 9/00309* (2013.01)

(58) Field of Classification Search
CPC .......................... G06F 1/3215; G07C 9/00309
USPC .............. 455/352, 41.2; 348/14.01; 340/5.64; 342/126; 701/2
See application file for complete search history.

(56) References Cited

U.S. PATENT DOCUMENTS

| | | | |
|---|---|---|---|
| 2009/0085720 A1* | 4/2009 | Kurpinski et al. | 340/5.64 |
| 2014/0114503 A1* | 4/2014 | Ghabra et al. | 701/2 |
| 2014/0232322 A1* | 8/2014 | Kracker et al. | 320/103 |
| 2014/0285319 A1* | 9/2014 | Khan et al. | 340/5.61 |

* cited by examiner

*Primary Examiner* — Creighton Smith
(74) *Attorney, Agent, or Firm* — Ingrassia Fisher & Lorenz, P.C.

(57) ABSTRACT

A method for activating a remote device is provided. In response to a determination that a remote device is within a first mode signal range of a vehicle and the remote device is moving, the method activates a second mode communication module of the remote device.

13 Claims, 3 Drawing Sheets

METHODS AND APPARATUS FOR OPTIMIZING BATTERY LIFE IN A REMOTE DEVICE

TECHNICAL FIELD

The subject matter presented herein generally relates to vehicles, and more particularly relates to passive-entry, passive-start (PEPS) systems and conserving the battery life of a remote device connected to a PEPS system.

BACKGROUND

A passive-entry, passive-start system allows a driver, or anyone who possesses an authorized remote device, such as a key fob, to unlock a vehicle's doors as they approach the vehicle without touching a remote device. Once the remote device is within range of the vehicle, locked doors can be opened by pulling a door handle. In addition, some passive-entry, passive-start (PEPS) systems can be configured to automatically start the vehicle's engine as an authorized remote device approaches the vehicle. Other PEPS systems require that the driver pushes an ignition button to start and/or stop the vehicle engine.

A problem with current PEPS functionality is that an authorized remote device must constantly be powered on or, in other words, connected to an active power supply, which may quickly utilize all available power (i.e., drain the battery of the remote device). The hardware is continuously active so that it can detect whether or not a vehicle is in range and the automatic functionality may be activated when appropriate. However, during certain periods of time when the remote device is not active, it is not necessary for the hardware to remain powered on. For example, when a remote device (such as a key fob) is outside of a pre-defined range of use, it will not be performing actions associated with PEPS functionality. In this example, the remote device will not be used, and will therefore not require power. Accordingly, it is desirable to conserve power within a remote device, in ways that will still allow the automatic functionality of the PEPS system to remain operational during times that it is possible to use it. Furthermore, other desirable features and characteristics of the present invention will become apparent from the subsequent detailed description and the appended claims, taken in conjunction with the accompanying drawings and the foregoing technical field and background.

SUMMARY

Some embodiments provide a method for conserving power in a remote device. The method receives, at the remote device, a first signal emitted by a vehicle; evaluates motion data from the remote device to determine a movement status of the remote device, wherein the evaluating is performed in response to receiving the first signal; and transitions a first wireless communication module of the remote device from a low power mode to an active mode, when the motion data indicates that the remote device is moving.

Some embodiments provide a method for activating a remote device. In response to a determination that a remote device is within a first mode signal range of a vehicle and the remote device is moving, the method activates a second mode communication module of the remote device.

Some embodiments provide a system comprising a remote device and a vehicle module, which are configured to communicated with one another using a first mode and a second mode, and which are further configured to perform a method. The method detects, at the remote device, presence of the vehicle module within a first mode signal range; polls an internal accelerometer of the remote device to obtain internal accelerometer data; analyzes the obtained internal accelerometer data to determine whether the remote device is in motion; and activates a second mode communication module within the remote device when the analyzing determines that the remote device is in motion.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

The subject matter presented herein relates to methods and apparatus used to optimize battery life in a remote device that is in communication with a PEPS system associated with a vehicle. In certain embodiments, the remote device utilizes a "sleep mode" (i.e., a low power mode) regularly, a condition in which the internal circuitry of the remote device is predominantly turned off. When the remote device determines that it is located within an authorized signal range of the vehicle and is approaching the vehicle, the internal circuitry of the remote device is activated.

The vehicle may be, without limitation, any one of a number of different types of types of automobiles (cars, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

Figure 1:
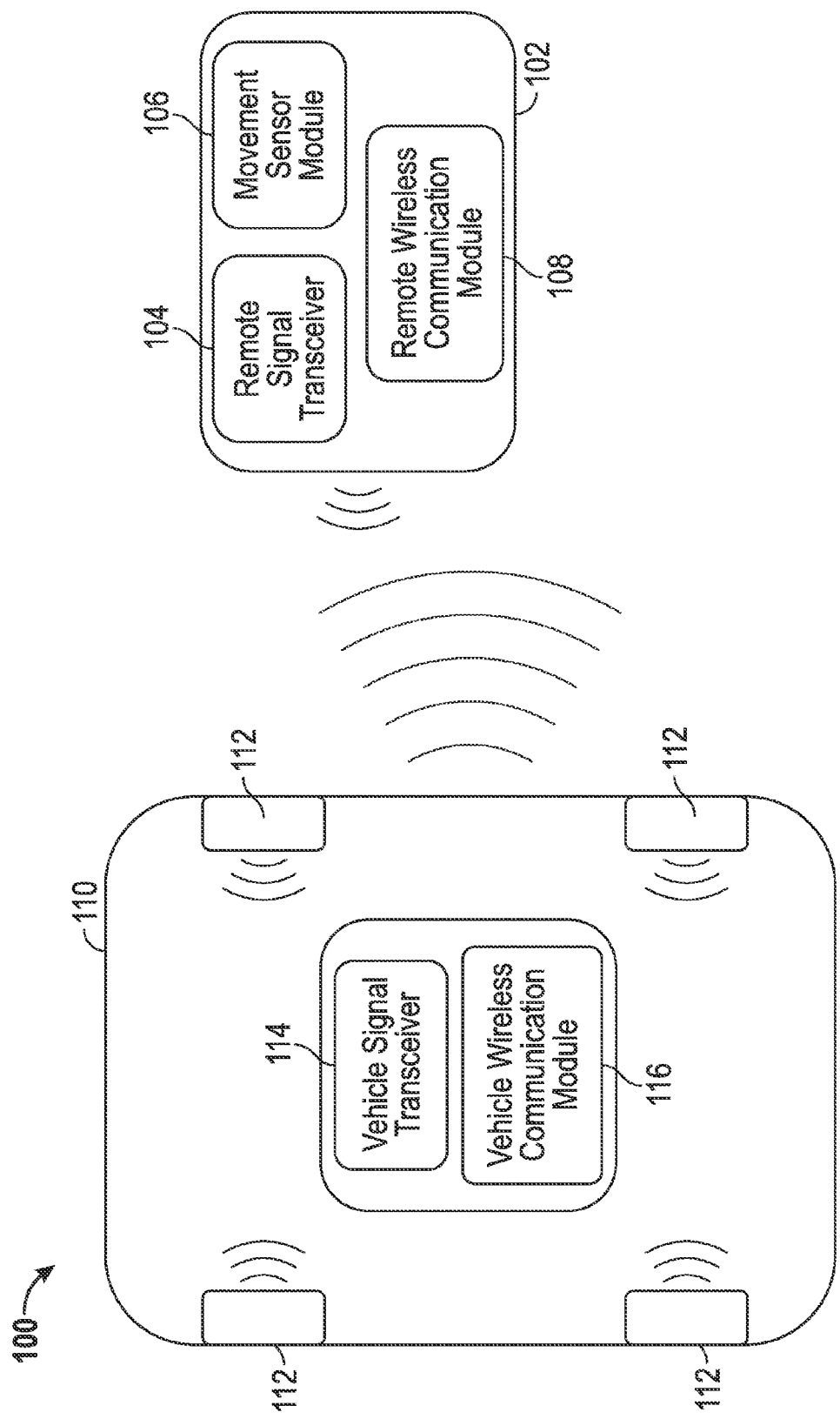
FIG. 1 is a functional block diagram of a PEPS system, in accordance with an embodiment.

Referring now to the drawings, FIG. 1 is a functional block diagram of a PEPS system 100, in accordance with an exemplary embodiment. In accordance with some embodiments, the PEPS system 100 may include, without limitation: a remote device 102, including a remote signal transceiver 104, a movement sensor module 106, and a remote wireless communication module 108; and a vehicle 110, including a plurality of antennas 112, a vehicle signal transceiver 114, and a vehicle wireless communication module 116.

The remote device 102 may be any wireless communications device such as a smart phone or other cellular phone, a laptop or palmtop computer, a tablet computer, a PDA, a remote controller, a key fob, a watch, a gaming pad, an entertainment device or any other device enabled to utilize wireless communication to communicate with a vehicle 110.

Further, it is noted that the PEPS system 100 may support the use of multiple remote devices 102, which may function independently of one another or cooperate with one another in a desired manner. For example, the PEPS system 100 may be defined to include multiple different devices in some implementations (e.g., a key fob and a wireless communication device such as a smart phone). As such, if a driver has a smart phone and a key fob (utilizing the same wireless communication standard signal type) with them, the system can process signal strength information from each of those devices independently to determine the proximity of the driver to the vehicle. This is also useful in situations where one of the devices is not available (e.g., is lost, out of power, does not work) since it provides a backup. For example, in one situation, the smart phone could be powered off or otherwise inactive, but the driver may have his key fob with him, or vice-versa. In another situation, the driver may have accidentally locked his key fob in the car and only has a smart phone with him.

The remote signal transceiver 104 within the remote device 102 may include a radio frequency transmitter and receiver, and communicates with another remote signal transceiver, such as vehicle signal transceiver 114 of a vehicle 110. In certain embodiments, the remote signal transceiver 104 continuously sends and receives low frequency signals, and requires minimal electric current to operate in a powered-on mode consistently. In the context of this application, a low frequency signal may fall within the range of 30 kilohertz (kHz) to 300 kHz, and a very low frequency signal may fall within the range of 3 kHz to 30 kHz. Also in the context of this application, low or minimal electric current may refer to values less than 20 microamps (μA).

The movement sensor module 106 is able to detect whether or not the remote device 102 is in motion, and may include any device, system, feature, or technology for determining acceleration, orientation, location, etc. In certain embodiments, one or more accelerometers (e.g., piezoelectric-based accelerometers, MEMS-based accelerometers, etc.) gyroscopes, or other motion-based sensors may be used. In some embodiments, infrared (IR) and/or magnetic field technology may be used for purposes of determining a location, position, and/or orientation of the remote device 102.

The remote wireless communication module 108, located within the remote device 102, transmits and receives wireless communication signals with an associated vehicle wireless communication module 116. In certain embodiments, the remote wireless communication module 108 is a Bluetooth-enabled device, including a Bluetooth antenna and a Bluetooth chipset (not shown). In this example, the remote wireless communication module 108 is capable of implementing all known Bluetooth standards and protocols including a Bluetooth Low Energy (BLE) protocol, as described in Bluetooth Core Specification Version 4.0, which includes Classic Bluetooth, Bluetooth High Speed (HS) protocols and Bluetooth Low Energy (BLE).

The remote wireless communication module 108 differs from the remote signal transceiver 104 in frequency range of communication, communication protocols used, and power consumption. The remote wireless communication module 108 utilizes a much higher frequency range than the remote signal transceiver 104. In certain embodiments, the remote wireless communication module 108 operates at approximately 2.4 GHz, while the remote signal transceiver 104 utilizes a low frequency signal range of 30 kHz-300 kHz. The remote wireless communication module 108 also consumes significantly more power than the remote signal transceiver 104, and in order to save power (i.e., to preserve battery life) in the remote device 102, the remote wireless communication module 108 remains in a sleep-state until required for use, while the remote signal transceiver 104 remains activated.

The remote wireless communication module 108 has the ability to go into "sleep mode" (i.e., low power mode), in which its power supply is cut off and most if not all of the vehicle support functionality associated with the remote wireless communication module 108 is effectively turned off. The "sleep mode" setting prevents the remote device 102 from utilizing unnecessary amounts of power. In this regard, the remote device 102 "wakes up" from the sleep mode (i.e., powers on) only when needed for use. Once powered on, the remote wireless communication module 108 advertises over one or more channels (i.e., transmits a signal for recognition by a vehicle wireless communication module 116) and is able to establish as communication connection with the vehicle wireless communication module 116 via a data channel. In some embodiments, the advertising channels and the data channel are compliant with Bluetooth Low Energy (BLE) communication standards and, therefore, the remote wireless communication module 108 can be involved. An established communication connection between a remote wireless communication module 108 and a vehicle wireless communication module 116 is established for performing at least one PEPS function (e.g., the doors are unlocked, engine is started, etc.) with respect to a vehicle as the remote device 102 approaches the vehicle 110 and meets authorization criteria.

Referring now to the configuration of the vehicle 110, the plurality of antennas 112 generally includes four or more antennas 112 located on the vehicle 110, which have the ability to communicate with the remote wireless communication module 108 and the vehicle wireless communication module 116. In certain embodiments, the vehicle 110 employs external antennas 112, which may be located in the door handles, wheels, or other components of the vehicle 110. Although these vehicle components may have another primary function on the vehicle 110, they may also be used in the PEPS system 100 to support the features and functions described in more detail herein. In other embodiments, however, the plurality of antennas 112 may include standalone antennas, which are not incorporated into other vehicle components.

As used in the PEPS system 100, the plurality of antennas 112 detects and measures the signal strength of an emitted wireless signal from the remote wireless communication module 108. In certain embodiments, the plurality of antennas 112 includes four or more Bluetooth antennas, which detect a signal strength of a remote wireless communication module 108 that is implemented as a Bluetooth Low Energy module. In this example, the plurality of antennas 112 also communicates with a vehicle wireless communication module 116 that is also implemented as a Bluetooth Low Energy module. The detected signal strength is then communicated to the vehicle wireless communication module 116 for further analysis.

The vehicle signal transceiver 114 within the vehicle 110 is similar to the remote signal transceiver 104, and may include a radio frequency transmitter and receiver for communication with another remote signal transceiver, such as remote signal transceiver 104. In certain embodiments, the signal transceiver 104 continuously sends and receives low frequency signals, and requires minimal power to consistently operate in a powered-on mode.

The vehicle wireless communication module 116, located within the vehicle 110, transmits and receives wireless communication signals with the associated remote wireless communication module 108. In certain embodiments, the vehicle wireless communication module 116 is a Bluetooth-enabled device, including a Bluetooth antenna and a Bluetooth chipset (not shown). Similar to the remote wireless communication module 108 that is implemented as a Bluetooth-enabled device, the vehicle wireless communication module 116 is capable of implementing all known Bluetooth standards and protocols including a Bluetooth Low Energy (BLE) protocol, as described in Bluetooth Core Specification Version 4.0, which includes Classic Bluetooth, Bluetooth High Speed (HS) protocols and Bluetooth Low Energy (BLE).

The vehicle wireless communication module 116 is also capable of maintaining a "sleep mode" status when not in use, and is configured to receive power when needed for use. Once the vehicle wireless communication module 116 is powered on, it performs a scan of advertising channels, seeking a connection with an appropriate remote wireless communication module 108 within a remote device 102. This connection is sought for performing at least one PEPS function (e.g., the doors are unlocked, engine is started, etc.) with respect to a vehicle as the remote device 102 approaches the vehicle 110 and meets authorization criteria.

Figure 2:
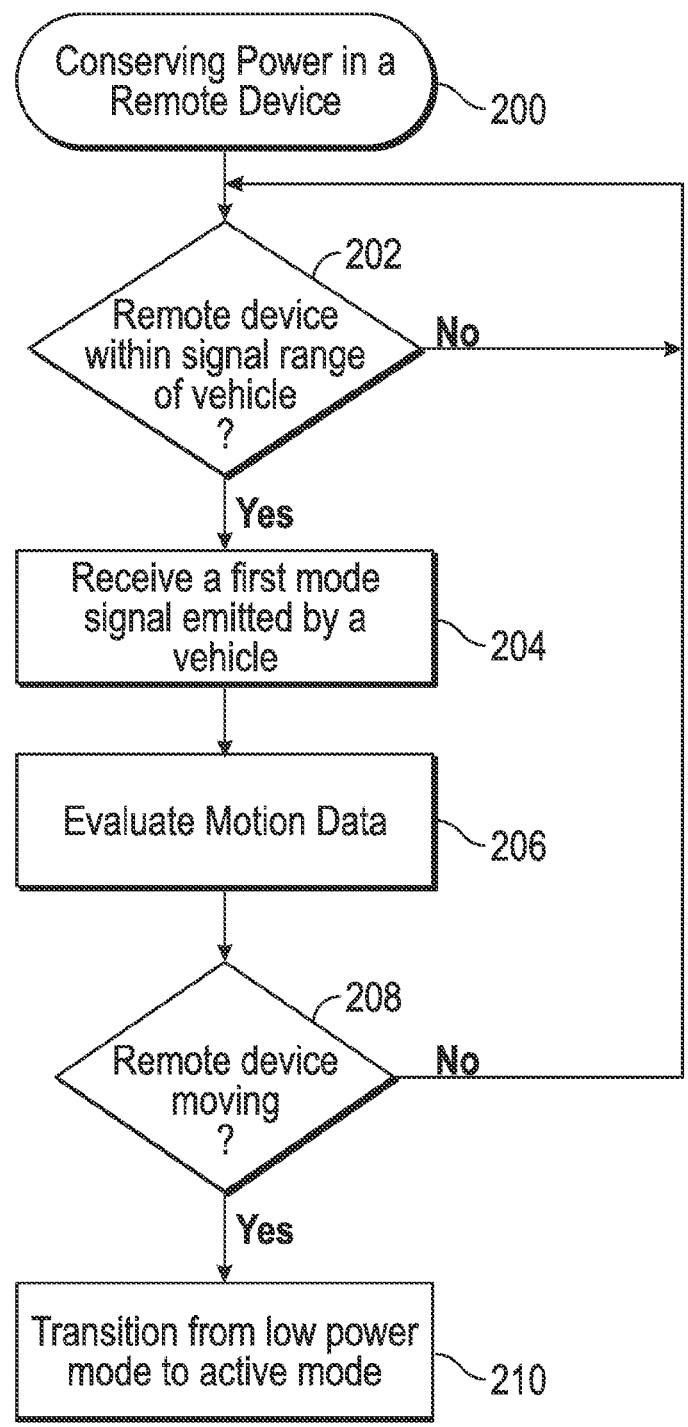
FIG. 2 is a flow chart that illustrates an embodiment of conserving power in a remote device, from the perspective of the remote device.

FIG. 2 is a flow chart that illustrates an embodiment of conserving power in a remote device. The various tasks performed in connection with a process described here may be performed by software, hardware, firmware, or any combination thereof. For illustrative purposes, the description of a process may refer to elements mentioned above in connection with FIG. 1. In practice, portions of a described process may be performed by different elements of the described system, e.g., the remote device or any of its internal parts, including the signal transceiver, movement sensor, and/or wireless communication module; or the vehicle or any of its internal parts, including the plurality of antennas, signal transceiver, and/or the wireless communication module; or other components of the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the process 200 begins with a remote device determining whether it is within signal range of a vehicle (step 202). The remote device begins in "sleep mode" (i.e., low power mode), and a signal receiver at the remote device is "listening" for a first mode signal continuously, in an attempt to detect the presence of the vehicle within signal range. The signal receiver at the remote device cannot receive a low frequency signal when it is out of signal range of the vehicle; thus, step 202 can only be performed when the remote device is within a specified distance of the vehicle. The remote device is in "listening" mode when operating in a low power mode and searching for a vehicle within first signal range. The remote device is in low power mode (i.e., "sleep mode") when an internal wireless communication module has been deactivated for purposes of power conservation. When it is determined that the remote device is not within signal range of the vehicle (the "No" branch of 202), the remote device continues to operate in low power mode and to "listen" for the first mode signal.

When it is determined that the remote device is within signal range of the vehicle (the "Yes" branch of 202), the signal receiver on the remote device receives a first mode signal emitted by a vehicle (step 204). In certain embodiments, the first mode signal may be a low frequency signal that is continuously broadcast by a transmitter onboard a vehicle. In other embodiments, the signal may be intermittently broadcast using designated time-intervals. Generally, detection of this signal indicates to the remote device that the vehicle is within a signal range in which PEPS functionality is operational.

Next, the process 200 initiates an evaluation of motion data (step 206) at the remote device. The motion data indicates movement in which the remote device is engaged. In certain embodiments, the motion data is derived from accelerometer data, when the accelerometer is a feature of the remote device. In this example, the motion data includes a measurement of any force of acceleration, which can be caused by movement of the remote device. In some embodiments, the motion data is derived from gyroscope data, when the gyroscope is a feature of the remote device. In other embodiments, the motion data is derived from other motion sensors which are features of the remote device.

Following the evaluation of motion data (step 206), the remote device uses the motion data to determine whether it is moving (step 208). When it has been determined that the remote device is not moving (the "No" branch of step 208), the remote device returns to the beginning of process 200, by transitioning into "listening" mode and searching for a first signal emitted by a vehicle (step 202).

When it has been determined that the remote device is moving (the "Yes" branch of step 208), the remote device activates an internal wireless communication module (step 210). Up to this point in the process 200, the wireless communication module has been in a low power mode, or powered off, for the purposes of conserving battery power in the remote device. When the motion data indicates that the remote device is moving, it is assumed that the remote device is approaching the vehicle. The wireless communication module is powered on at this point, and is ready for use.

Figure 3:
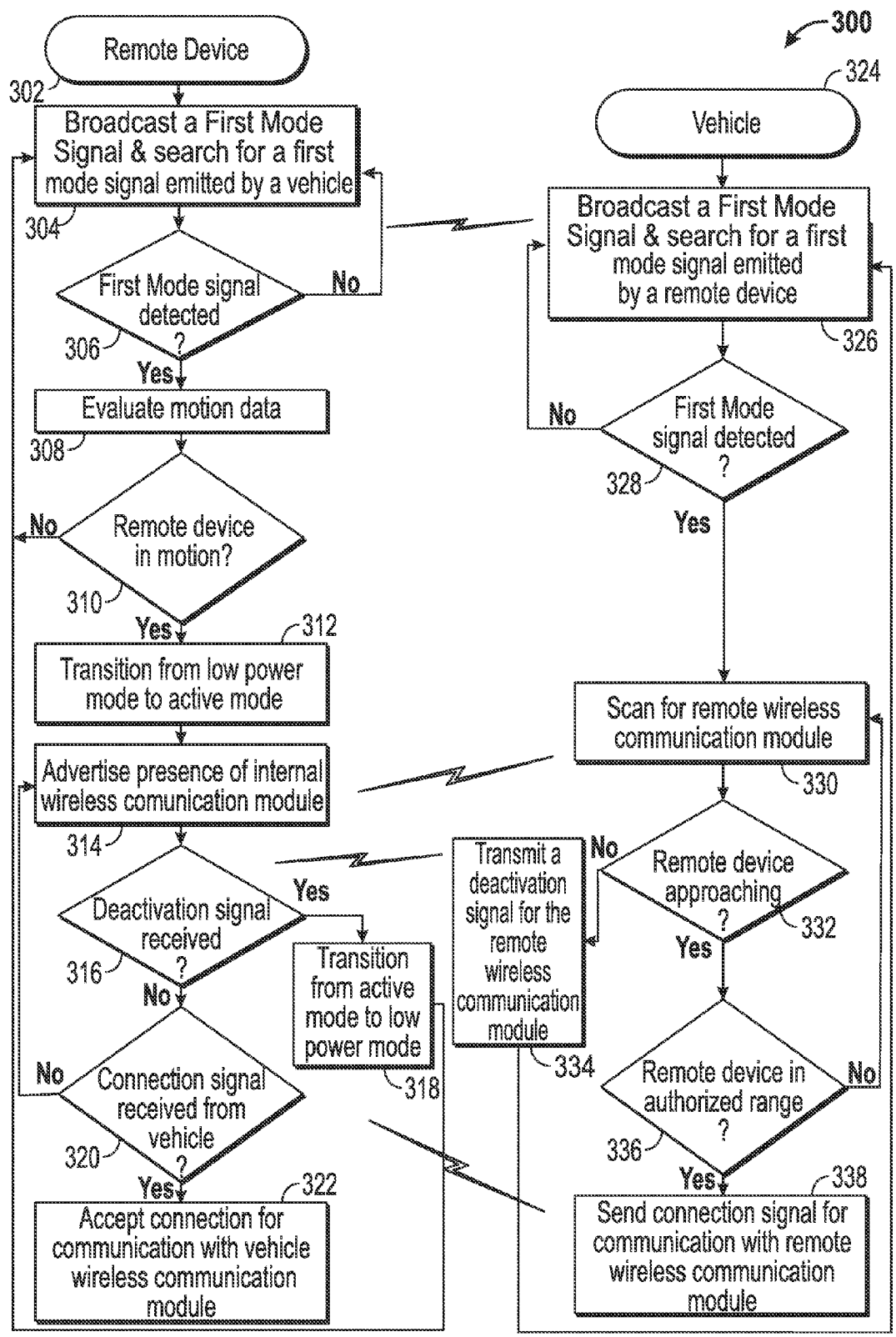
FIG. 3 is a flow chart that illustrates another embodiment of conserving power in a remote device, from the perspective of a system.

FIG. 3 is a flow chart that illustrates another, more detailed, embodiment of conserving power in a remote device, from the perspective of the PEPS system 100. This example illustrates the steps in the process 300 that are performed by a remote device process 302 and a vehicle process 324, and how they relate to each other to complete the process 300.

The process 302 involves the remote device, which begins operation in a state of minimal power use. In FIG. 3, step 304 corresponds to the remote device searching or listening for a first mode signal, while simultaneously broadcasting a first mode signal for purposes of detection by a vehicle. The first mode signal may be implemented as any wireless communication requiring minimal power to broadcast. In some embodiments, the first mode signal may be a low frequency signal, which may be continuously emitted from both the vehicle and the remote device. In other embodiments, another signal broadcast scheme may be implemented, such as a signal that is broadcast on a time interval. Presence of the first mode signal is an indication to the remote device that the vehicle is located within a range for wireless communication, and may be available for connection. As indicated by the "No" branch of step 306, the remote device remains in a searching or listening mode until a first mode signal is detected.

After the remote device detects a first mode signal (the "Yes" branch of step 306), the remote device then evaluates motion data (step 308) to determine if the remote device is in motion (step 310). The motion data may include accelerometer data, gyroscope data, or other motion sensor data indicating that the remote device is moving. If the remote device is not in motion (the "No" branch of 310), the remote device returns to the beginning of process 302 to broadcast a first mode signal and to search for a first mode signal emitted by a vehicle (step 304). If the remote device is in motion (the "Yes" branch of 310), the remote device transitions from low power mode to active mode (step 312) or in other words, converts from "sleep mode" in which the wireless communication module is powered off to an active mode in which the wireless communication module is powered on.

After the remote wireless communication module has transitioned to the active mode (step 312), the remote device advertises the presence of an internal wireless communication module (step 314) of the remote device. The signal advertising the presence of the remote device is a second mode signal, which may utilize any wireless communication standard, such as Bluetooth or Bluetooth Low Energy. The second mode signal is transmitted by a wireless communication module, which is separate and distinct from the first mode signal transceiver.

While advertising the presence of the internal wireless communication module (step 314), the remote device may receive signal transmissions from the vehicle, such as a deactivation signal or a signal establishing a connection with the internal wireless communication module. If a deactivation signal is received from the vehicle (the "Yes" branch of 316), then the remote device transitions from active mode back to low power mode (step 318), and returns to the beginning of process 302 to search for a first mode signal emitted by a vehicle (step 304). However, if a deactivation signal from the vehicle is not received (the "No" branch of 316), the remote device may still receive signal transmissions. If a signal to establish a connection with the vehicle is not received (the "No" branch of 320), the remote device returns to advertising the presence of a remote wireless communication module via signal transmission over advertising channels (step 314). If a signal to establish a connection with the vehicle is received (the "Yes" branch of 320), the remote device accepts the connection for communication with the vehicle (step 322), or more specifically, the remote device accepts the connection for communication with a wireless communication module of the vehicle.

The process 324 involves the vehicle, which broadcasts a first mode signal for detection by a remote device in low power mode, and listens for a first mode signal emitted by the remote device. In FIG. 3, step 326 corresponds to the vehicle broadcasting and listening for a first mode signal. The first mode signal is described previously, in relation to process 302, and will not be redundantly described here.

When the vehicle 324 does not detect a first mode signal emitted by the remote device (the "No" branch of 328), the vehicle 324 continues to broadcast and listen for a first mode signal (step 326). When the vehicle detects a first mode signal emitted by the remote device (the "Yes" branch of 328), the vehicle 324 begins scanning for a remote wireless communication module (step 330). The result is described previously as it relates to process 302: after the remote wireless communication module has transitioned to the active mode (step 312), the remote device advertises the presence of an internal wireless communication module (step 314). Concurrently, the vehicle scans appropriate advertising channels for the signal emitted by the remote wireless communication module (step 330). The signal advertising the presence of the remote device is a second mode signal, which may utilize any wireless communication standard, such as Bluetooth or Bluetooth Low Energy (BLE). The second mode signal is transmitted by a wireless communication module, which is separate and distinct from the first mode signal transceiver.

Next, the vehicle uses the advertising signal transmitted by the remote device to determine whether the remote device is approaching the vehicle (step 332). The signal strength of the transmitted advertising signal is detected by a plurality of antennas on the vehicle, and the vehicle is able to use the data from the plurality of antennas to determine a distance from the vehicle to the remote device. In certain embodiments, the vehicle triangulates the position of the remote device over a period of time, and the vehicle compares each position to determine if the distance between the remote device and the vehicle is decreasing over time. When the distance is decreasing over time, it is determined that the remote device is approaching the vehicle. When the distance is not decreasing over time, it is determined that the remote device is not approaching the vehicle.

In some implementations, the vehicle processes information from signals received by one of a plurality of antennas to determine signal strength information, and in some implementations, to determine the approximate distance between the source of those signals (e.g., the remote device) and the antenna. For example, when the plurality of antennas is implemented as a group of four Bluetooth antennas on the vehicle, the strength of a signal detected by one of the Bluetooth antennas is received, and is used by the vehicle to determine the approximate distance between the remote device and the particular Bluetooth antenna in use. In other words, signal strength information observed and determined at multiple sensors can be processed by the vehicle using known triangulation technologies to determine the approximate distance of an end device from one or more of the tires. In certain embodiments, a BLE sensor on the vehicle detects an advertised signal from a remote device, and uses received signal strength indication (RSSI) feedback to determine whether the remote device is approaching the vehicle.

When it has been determined that the remote device is not approaching the vehicle (the "No" branch of 332), then the vehicle transmits a deactivation signal to the remote wireless communication module. This description assumes that the remote device receives the deactivation signal (step 316) and then transitions from the active mode to the low power mode (step 318). Thus, when the remote device is not approaching the vehicle, the vehicle sends a signal indicating that the internal wireless communication module of the remote device should power down, in order to conserve power, and the remote device returns to its "listening" mode, searching for a first mode signal emitted by the vehicle (step 304).

When it has been determined that the remote device is approaching the vehicle (the "Yes" branch of 332), the vehicle determines if the remote device is within an authorized range (step 336) to establish a connection for communication. The authorized range is a distance value that is known to the vehicle process 324, and the distance of the remote device determined at decision step 332, using signal strength, is also used here to determine whether the remote device is located within the authorized range.

Alternatively, any other link quality indicators, such as a Bluetooth proximity profile, can be used to determine the distance between two Bluetooth Low Energy (BLE) enabled devices, such as a BLE enabled remote device and a BLE enabled antenna. The proximity profile is defined in the BLE standard. The proximity profile uses a number of metrics including signal strength information, state of the battery charge, whether a device is connected, etc. to characterize the proximity of one BLE enabled device (e.g., a remote device to another BLE enabled device).

When the remote device is not within the authorized range (the "No" branch of 336), the vehicle process 324 returns to scanning for an internal wireless communication module of the remote device within signal range (step 330). When the remote device is determined to be within an authorized range (the "Yes" branch of 336), the vehicle sends a connection signal for communication with the remote wireless communication module (step 338). As described previously, the remote device receives and accepts this connection signal (the "Yes" branch of 320). This establishes a connection for communication between the remote wireless communication module and the vehicle wireless communication module for the purpose of performing PEPS functionality.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for conserving power in a remote device, comprising:
    receiving, at the remote device, a first signal emitted by a vehicle;
    evaluating motion data from the remote device to determine a movement status of the remote device, wherein the evaluating is performed in response to receiving the first signal; and
    transitioning a first wireless communication module of the remote device from a low power mode to an active mode, when the motion data indicates that the remote device is moving;
    establishing a communication connection between the first wireless communication module and a second wireless communication module of the vehicle, wherein the communication connection is established when the vehicle determines:
        the remote device is approaching the vehicle, and
        the remote device is located in an authorized communication range;
    wherein the determining that the remote device is approaching the vehicle comprises:
    obtaining a plurality of triangulated positions of the remote device and associated time values using a plurality of antennas on the vehicle;
    determining a distance from the vehicle for each of the plurality of triangulated positions; and
    evaluating the distance from the vehicle for each of the plurality of triangulated positions at each of the associated time values.

2. The method of claim 1, wherein the received first signal comprises a low frequency signal that is continuously emitted from at least one antenna on the vehicle.

3. The method of claim 1, further comprising:
    generating gyroscope data using a gyroscope of the remote device;
    wherein the motion data is derived from the gyroscope data.

4. The method of claim 1, further comprising:
    generating accelerometer data using an accelerometer of the remote device;
    wherein the motion data is derived from the accelerometer data.

5. The method of claim 1, further comprising:
    receiving a deactivation signal at the remote device, wherein the deactivation signal is transmitted by the vehicle when the vehicle determines the remote device is not approaching the vehicle; and
    transitioning the first wireless communication module from the active mode to the low power mode, in response to the deactivation signal.

6. A method for activating a remote device, comprising:
    in response to a determination that a remote device is within a first mode signal range of a vehicle and the remote device is moving,
        activating a second mode communication module of the remote device;
    after the second mode communication module is activated, establishing a connection for communication with the second mode communication module of the remote device when:
        the remote device is approaching the vehicle; and
        the remote device is located within an authorized communication range;
    detecting, at the vehicle, a signal strength from the second mode communication module of the remote device;
    determining, based on the detected signal strength, whether distance between the vehicle and the remote device is decreasing over time, which indicates that the remote device is approaching the vehicle; and
    transmitting a deactivation signal to deactivate the second mode communication module of the remote device, wherein the deactivation signal is transmitted from the vehicle when the distance between the vehicle and the remote device is determined not to be decreasing over time.

7. The method of claim 6, further comprising:
    receiving, at the remote device, a first mode signal broadcast by the vehicle;
    wherein the first mode signal comprises a low frequency signal.

8. The method of claim 6, further comprising:
    generating accelerometer data using an accelerometer of the remote device;
    determining that the remote device is moving using the accelerometer data.

9. The method of claim 6, further comprising:
    detecting, at the vehicle, a signal strength from the second mode communication module of the remote device;
    determining, based on the detected signal strength, a distance between the vehicle and the remote device;
    evaluating the distance from the vehicle to the remote device to determine whether the remote device is located within an authorized communication range.

10. A system comprising a remote device and a vehicle module, the remote device and the vehicle module being configured to wirelessly communicate with one another using a first mode and a second mode, and the remote device and the vehicle module being further configured to perform a method comprising:
    detecting, at the remote device, presence of the vehicle module within a first mode signal range;

polling an internal sensor of the remote device to obtain motion data;

analyzing the obtained motion data to determine whether the remote device is moving; and activating a second mode communication module within the remote device when the analyzing determines that the remote device is moving;

wherein the vehicle module is further configured to:

detect, at the vehicle module, a signal strength from the second mode communication module of the remote device;

determine, based on the detected signal strength, a distance between the vehicle module and the remote device;

evaluate the distance from the vehicle module to the remote device to determine whether the remote device is located within an authorized communication range;

determine, based on the detected signal strength, whether distance between the vehicle module and the remote device is decreasing over time, indicating that the remote device is approaching the vehicle module; and deactivate the second mode communication module of the remote device when the remote device is determined not to be approaching the vehicle module.

11. The system of claim 10, wherein, after the second mode communication module is activated, the vehicle module is further configured to establish a connection for communication with the second mode communication module of the remote device when:

the remote device is approaching the vehicle module; and the remote device is located within an authorized communication range.

12. The system of claim 10, wherein, after the vehicle module deactivates the second mode communication module, the remote device is further configured to search for presence of a vehicle module using the first mode signal range.

13. The system of claim 10, wherein:

the vehicle module is further configured to continuously emit a low frequency broadcast signal;

the remote device is further configured to:

receive the low frequency broadcast signal; and detect the presence of the vehicle module within the first mode signal range, based on the received low frequency broadcast signal.

* * * * *